United States Patent [19]
Bethune et al.

[11] Patent Number: 5,093,832
[45] Date of Patent: Mar. 3, 1992

[54] LASER SYSTEM AND METHOD WITH TEMPERATURE CONTROLLED CRYSTAL

[75] Inventors: Donald S. Bethune, San Jose; William J. Kozlovsky, Mountain View, both of Calif.

[73] Assignee: International Business Machines Corporation, Armonk, N.Y.

[21] Appl. No.: 669,157

[22] Filed: Mar. 14, 1991

[51] Int. Cl.$^5$ .............................................. H01S 3/10
[52] U.S. Cl. ........................................ 372/21; 372/31; 372/34; 359/326; 359/328
[58] Field of Search ............. 372/21, 22, 34, 31, 372/33; 307/425, 427; 369/122

[56] References Cited

U.S. PATENT DOCUMENTS

| | | | |
|---|---|---|---|
| 3,588,738 | 6/1971 | Goodwin | 372/106 |
| 3,858,056 | 12/1974 | Melamed et al. | 307/428 |

OTHER PUBLICATIONS

M. K. Chun et al., *Applied Physics Letters*, vol. 55, pp. 218-220, Jul. 17, 1989.
P. Gunter et al., *Applied Physics Letters*, vol. 35, pp. 461-463, Sep. 15, 1979.
W. J. Kozlovsky et al., *IEEE Journal of Quantum Electronics*, vol. 24, No. 6, pp. 913-919, Jun. 1988.
W. J. Kozlovsky et al., *Optic Letters*, vol. 12, No. 12, pp. 1014-1016, Dec. 1987.
A. Ashkin et al., "Resonant Optical Second Harmonic Generation and Mixing", *IEEE Journal of Quantum Electronics*, QE-2, pp. 109-124.
W. J. Kozlovsky et al., *Applied Physics Letters*, vol. 56, No. 23, pp. 2291-2292, Jun. 1990.

*Primary Examiner*—James W. Davie
*Attorney, Agent, or Firm*—Douglas R. Millett

[57] ABSTRACT

A laser produces a light beam which is passed through a nonlinear crystal along a beam path. The noncritical phase matching axis of the nonlinear crystal is offset at a slight angle from the beam path. The angle of exit of the second harmonic light from the nonlinear crystal varies with the temperature of the crystal. A segmented photodetector detects this beam angle and generates a temperature error signal. A temperature control element receives a temperature error signal and causes the temperature of the crystal to be adjusted.

14 Claims, 3 Drawing Sheets

LASER SYSTEM AND METHOD WITH TEMPERATURE CONTROLLED CRYSTAL

BACKGROUND OF THE INVENTION

1. Field of the Invention

This invention relates generally to laser systems and more particularly to laser systems which use nonlinear crystals.

2. Description of the Prior Art

Semiconductor diode lasers are of interest for a number of applications such as optical data storage, laser printing and biochemical analysis. One example is the gallium-aluminum-arsenide (GaAlAs) diode laser which generates light in the near infrared range (856 nm in wavelength). In optical data storage systems, the light from the laser diode is focussed onto a spot on the optical disk in order to record each bit of data. The spot size is approximately equal to $\lambda/(2*(N.A.))$, where $\lambda$ is the wavelength of the light and N.A. is the numerical aperture of the focusing lens. In typical systems, the N.A. is approximately 0.5 and the resulting spot size is 856 nm in diameter.

It is apparent that if the wavelength of the laser light can be cut in half, the diameter of the spot size will also be cut in half and the overall density of the optical disk may be quadrupled. Unfortunately, laser diodes which produce light in the blue range (430 nm in wavelength) are not available.

One technique to convert light to a higher frequency is known as second harmonic generation (SHG). A laser beam at a first lower frequency is passed through a nonlinear crystal, such as potassium niobate ($KNbO_3$), which produces a second harmonic (SH) light beam (i.e., a beam at twice the frequency of the original laser beam which entered the nonlinear crystal). This SHG technique is described in articles by M. K. Chun, et al., *Applied Physics Letters*, Vol. 55, p. 218, July 17, 1989; and P. Gunter, et al., *Applied Physics Letters*, Vol. 35, p. 461, Sept. 15, 1979. However, since the diode laser's output power is low, techniques to improve the second harmonic generation efficiency are required in order to produce a useful and efficient laser system.

One way to increase the efficiency of the SHG system is to place an optical resonator around the nonlinear crystal. The laser light is reflected back and forth through the crystal inside the resonator in order to generate a substantial amount of the blue light. This technique is described by W. J. Kozlovsky, et al., *IEEE Journal of Quantum Electronics*, Vol. 24, No. 6, p. 913, June 1988; W. J. Kozlovsky, et al., *Optics Letters*, Volt. 12, No. 12, p. 1014, December 1987; and A. Ashkin, et al., "Resonant Optical Second Harmonic Generation and Mixing," *IEEE Journal of Quantum Electronics*, QE-2, p. 109, June 1966; and W. J. Kozlovsky, et al., *Applied Physics Letters*, Vol. 56, No. 23, p. 2291, June 1990.

In order for efficient SHG to occur, the initial laser beam and the SHG light beam must be phase matched within the nonlinear crystal. This can be achieved by maintaining the crystal temperature at the critical phase matching temperature. U.S. Pat. No. 3,858,056 issued Dec. 31, 1974 by Melamed, et al., shows a temperature control system for a nonlinear crystal. The intensity of the output light is measured by a detector. When the output light intensity is at a maximum the crystal is at the correct temperature. A problem with this type of system is that the light intensity error signal does not indicate in which direction to adjust the crystal temperature. The system must sample at least two temperature points in order to determine the correct direction to adjust the temperature. This type of system is very unstable and it is very difficult to maintain the exact optimum temperature. This is a critical problem where the temperature must be maintained within a small range of fractions of degrees C.

What is needed is a simple temperature control system which will maintain the nonlinear crystal at the exact optimum temperature.

SUMMARY OF THE INVENTION

In a preferred embodiment of the present invention, a laser diode provides a fundamental frequency beam of light to a nonlinear crystal resonator. The nonlinear crystal is positioned within the resonator such that its noncritical phase matching axis is offset at a slight angle from the beam path of the fundamental frequency beam. A second harmonic frequency beam is produced and is output from the resonator. A split photodetector detects the temperature dependent angle change of this second harmonic frequency output beam. A temperature control circuit connected to the split photodetector controls a thermo-electric cooler or heater element responsive to the change in output angle of the second harmonic beam in order to maintain the crystal at the critical phase matching temperature. The result is a simple temperature control system which provides temperature locking for maximum generation of second harmonic light.

For a fuller understanding of the nature and advantages of the present invention reference should be made to the following detailed description taken in conjunction with the accompanying drawings.

DESCRIPTION OF THE PREFERRED EMBODIMENTS

Figure 1:
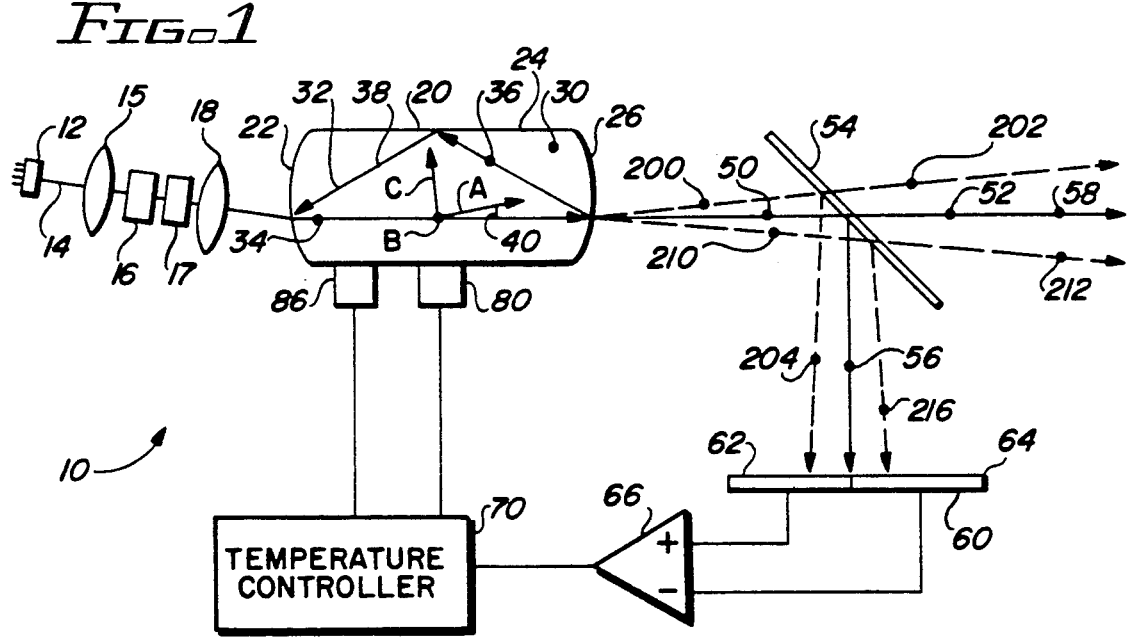
FIG. 1 is a schematic diagram of a laser system of the present invention.

FIG. 1 shows a laser system of the present invention and is designated by the general reference number 10. System 10 detects the angular change of the output beam from a nonlinear resonator in order to generate a temperature error signal.

System 10 has a laser diode 12. Laser diode 12 may be a gallium-aluminum-arsenide (GaAlAs) laser diode which generates a light beam 14 at approximately 856 nm wavelength (near infrared). Beam 14 is also referred to as the fundamental frequency light beam. Although light is used in the preferred embodiment, other types of electromagnetic radiation may also be used.

Beam 14 is collimated by a lens 15 and passes through a circularizing prism 16 and a Faraday Isolator 17. The light is then coupled by a lens 18 into an optical resonator 20. Resonator 20 is a three sided ring resonator having a plurality of mirror surfaces 22, 24 and 26. A total internal reflectance surface may alternatively be used in place of mirror 24. The frequency of the laser diode 12 is matched to the resonance frequency of resonator 20. A nonlinear crystal 30 is located within resonator 22. In a preferred embodiment, the nonlinear crystal 30 is made of potassium niobate ($KNbO_3$).

Mirror 22 has a reflectivity R1 for the fundamental frequency light beam 14 from laser 12. The reflectivity R1 is chosen such that resonator 20 will impedance match the light beam 14 from laser 12 so that the light coupled into resonator 20 is maximized. A more detailed description of impedance matching is given in the article by W. J. Kozlovsky, et al., "Efficient Second Harmonic Generation of a Diode Laser Pumped Cd Nd:YAG Laser," *IEEE Journal of Quantum Electronics*, Vol. QE-24, No. 6, p. 913, (1988).

Mirror 24 has a reflectivity of approximately one hundred percent (100%) at the fundamental frequency. Mirror 26 has a reflectivity of greater than or equal to ninety-five percent (95%) for fundamental frequency light and a transmission of greater than eighty percent (80%) for SH light.

Mirrors 22, 24 and 26 are made of a multi-layer dielectric coating as is known in the art. The layers may be made of $SiO_2$ and $TiO_2$ in alternating layers. These dielectric coatings may be deposited directly on the surface of crystal 30 or alternatively separate mirrors may be used.

Resonator 20 has an internal beam path 32 which comprises a primary leg beam path 34 and two secondary leg beam paths 36 and 38. Crystal 30 has A, B and C crystallographic axes as are known in the art. In FIG. 1 the B axis is shown as being perpendicular to the paper. Crystal 30 is positioned within resonator 20 such that the A axis (noncritical phase matching axis) is offset at a slight angle 40 from the path 34. In a preferred embodiment the angle 40 is in the range of approximately 0.1 to 5 degrees, although operation is possible with other angles.

For the nonlinear crystal $KNbO_3$ and for fundamental frequency light at 856 nm wavelength the A axis is the noncritical phase matching axis. Other wavelengths and other nonlinear crystals may have different noncritical phase matching axes. In all cases the noncritical phase matching axis should be offset at a slight angle from the beam path.

Figure 2:
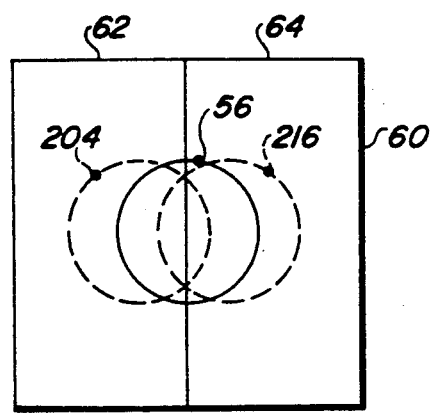
FIG. 2 is a schematic diagram of a photodetector of FIG. 1.

Resonator 20 outputs a SH light beam 50 along an axis 52. A beamsplitter 54 is located along the path of beam 50. A portion of beam 50 is reflected by beamsplitter 54 as a beam 56 and a remaining portion of beam 50 continues through beamsplitter 54 as a beam 58. Beam 56 falls upon a photodetector 60. Photodetector 60 has a first section 62 and a second section 64. See FIG. 2. The output from sections 62 and 64 are connected to a differential amplifier 66. The output of differential amplifier 66 is connected to a temperature controller 70. Temperature controller 70 is connected to a crystal temperature element 80 and a temperature monitor 86. In a preferred embodiment, element 80 is a thermo-electric cooler (also called a Peltier element) and temperature monitor 86 is a thermistor. A resistive heater may also be used as element 80. The crystal temperature element 80 and temperature monitor 86 are attached to crystal 30.

Figure 3:
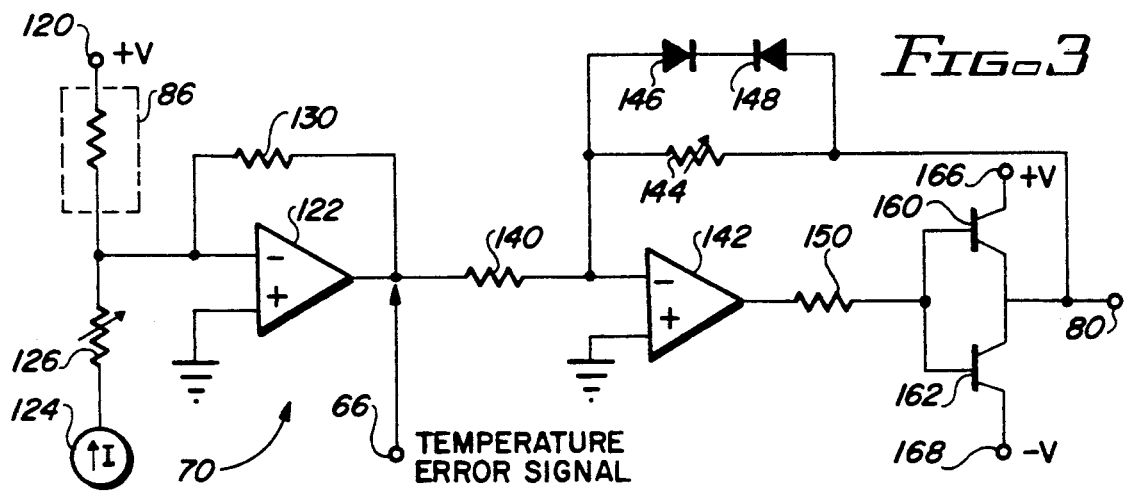
FIG. 3 is a circuit diagram of a temperature controller of the present invention.

FIG. 3 is a circuit diagram of a temperature controller 70 of system 10. A positive voltage source 120 is connected to thermistor 86. Thermistor 86 is connected to an amplifier 122. A current source 124 is connected to a variable resistor 126. Resistor 126 is connected to amplifier 122. A gain resistor 130 is connected parallel to amplifier 122. The output of amplifier 122 and the output of amplifier 66 are connected to resistor 140. Resistor 140 is connected to an amplifier 142, a variable resistor 144, and a pair zener diodes 146 and 148. The output of amplifier 142 is connected to a resistor 150. A pair of power transistors 160 and 162 are connected to resistor 150. A positive voltage source 166 is connected to transistor 160 and a negative voltage source 168 is connected to transistor 162. Transistors 160 and 162, variable resistor 144 and diode 148 are all connected to crystal temperature element 80. Although temperature controller 70 is shown as the preferred embodiment, other types of temperature controllers may also be used.

The operation of system 10 may now be understood. Laser diode 12 produces a polarized beam 14 of fundamental frequency light. The light passes through lens 15, prism 16 and Faraday Isolator 17. Lens 18 focuses beam 14 through mirror 22 of resonator 20. The fundamental frequency light then travels around beam path 32 inside resonator 20. The plane of polarization of the fundamental frequency light is parallel to the B axis of crystal 30. Lens 16 focuses the light so that the fundamental frequency light entering resonator 20 is spatially mode matched to the fundamental frequency light which is already traveling around path 32. Spatial mode matching is discussed in the article "Laser Beams and Resonators," *Applied Optics*, Vol. 5, pp. 1550–1567, October 1966.

Fundamental frequency light within resonator 20 is converted to SH light by repeated passes through crystal 30. The SH light 50 readily exits through mirror 26. The second harmonic generation process will produce the maximum second harmonic light when crystal 30 is maintained at the critical phase matching temperature. The SH light 50 exits resonator 20 along axis 52. A portion of beam 50 is reflected by beamsplitter 54 as beam 56. Beam 56 will fall exactly on the center of photodetector 60 when the crystal 30 is at the critical phase matching temperature. See FIG. 2. The output of both detectors 62 and 64 will then be equal and amplifier 66 will output a zero error signal to temperature controller 70.

If crystal 30 is at a temperature above the critical phase matching temperature, then the SH light will exit resonator 30 as a beam 200 along an axis 202. Axis 202 is oriented at a slight angle above axis 52. A portion of beam 200 is reflected by beamsplitter 54 as a beam 204. Beam 204 falls on photodetector 60 with the majority of the beam on section 62. Amplifier 66 will generate a positive temperature error signal. Temperature controller 70 will cause element 80 to cool crystal 30.

If crystal 30 is below the critical phase matching temperature, then the SH light will exit resonator 30 as a beam 210 along an axis 212. A portion of beam 210 is reflected by beamsplitter 54 as a beam 216. Beam 216 falls on photodetector 60 with a majority of the beam on section 64. Amplifier 66 will generate a negative temperature error signal. The temperature controller 70 will cause element 80 to heat crystal 30.

At the critical phasematching temperature (To) optimum phasematching will occur along axis 34 and a maximum amount of SH light is output along axis 52. At crystal temperatures other than To, the direction for optimum phasematching is rotated slightly away from axis 34. Due to the fact that axis 34 is slightly offset from the noncritical phasematching axis A, the phasematching direction will lie on one side of axis 34 for temperatures above To and on the other side of axis 34 for temperatures below To. For these other temperatures, the portion of the focussed fundamental frequency light beam that propagates closer to the direction of the noncritical phasematching axis A will produce SH light more efficiently, resulting in a net direction change in the output SH light beam.

The operation of temperature controller 70 can be described by referring to FIG. 3. Thermistor 86 is attached to crystal 30 and outputs a temperature signal corresponding to the temperature of the crystal. Variable resistor 126 is adjusted to provide a setpoint. The output of resistor 126 and the temperature signal from thermistor 86 will be equal and opposite when the crystal 30 is at its critical phase matching temperature so that there will then be no input to amplifier 122. Amplifier 122 provides a rough temperature error signal. This rough temperature error signal is added to the temperature error signal from amplifier 66. The two signals are then input to amplifier 142 which causes power transistors 166 and 168 to feed negative or positive voltage to element 80.

Figure 4:
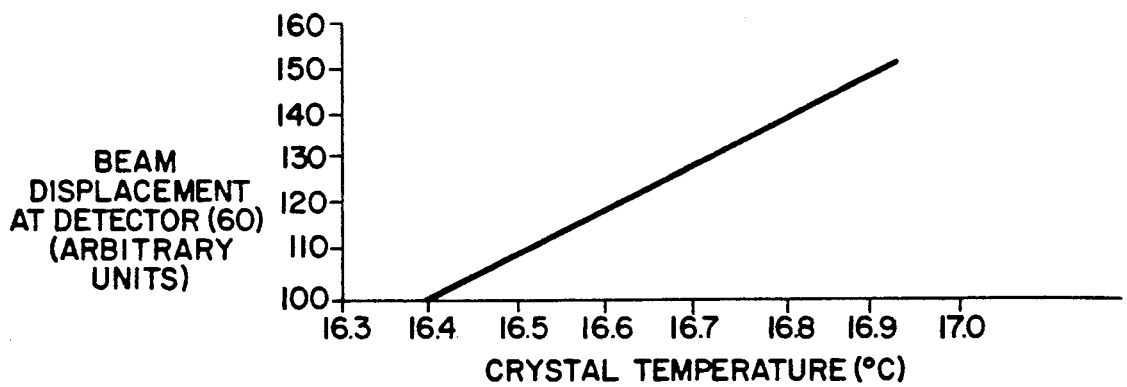
FIG. 4 is a graph of beam displacement versus crystal temperature.

FIG. 4 shows a graph of beam displacement versus crystal temperature. For small changes in temperature the relation is approximately linear. It has been found that a one degree Celsius change in temperature will result in the angle of the output beam 50 changing such that the corresponding beam displacement is approximately one beam diameter at detector 60.

Figure 5:
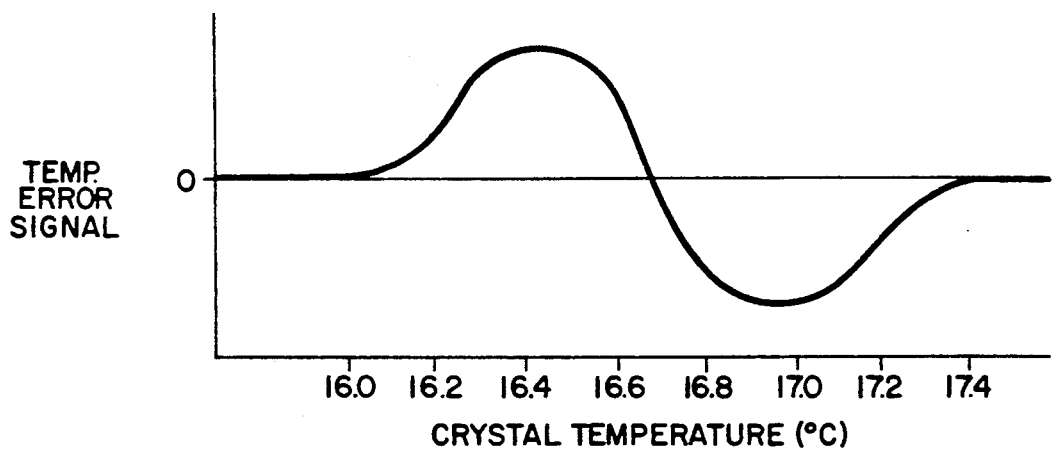
FIG. 5 is a graph of temperature error signal versus crystal temperature.

FIG. 5 shows a graph of the temperature error signal from amplifier 66 versus crystal temperature. Depending upon the beam displacement, a negative or positive temperature error signal is produced. The temperature error signal provides a zero point on which to lock. It should be noted that at temperatures well above and below the critical phase matching temperature, the temperature error signal will also be zero. This occurs when the temperature of the nonlinear crystal is so far from the critical phase matching temperature that no second harmonic light is produced and no light is detected at detector 60. The rough temperature error signal from amplifier 122 ensures that the system will operate in the critical temperature range where the temperature error signal from amplifier 66 exists.

Figure 6:
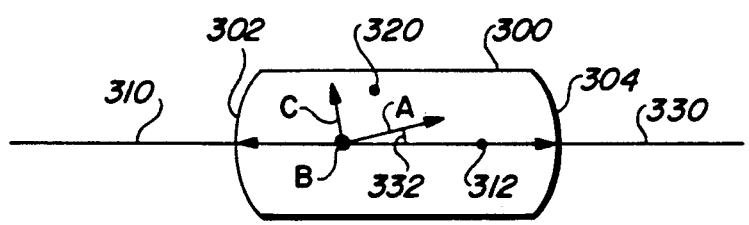
FIG. 6 is a schematic diagram of an alternative embodiment of a nonlinear crystal resonator.

FIG. 6 shows an alternative embodiment of a resonator and designated by the general reference number 300. Resonator 300 may be substituted for resonator 20 of system 10. Resonator 300 has a pair of mirrors 302 and 304, which are of similar construction to mirrors 22 and 26, respectively, of resonator 20. Fundamental frequency light 310 enters resonator 300 and is reflected back and forth inside resonator 300 along a path 312. A nonlinear crystal 320 is positioned within resonator 300 with its noncritical phase matching axis (A axis for $KNbO_3$ at 856 nm fundamental frequency wavelength) offset at a slight angle 322 to path 312. Angle 322 may be approximately 0.1 to 5 degrees in a preferred embodiment. The second harmonic light 330 exits resonator 300 at mirror 304. Resonator 300 is impedance matched and mode matched to the incoming light as described above.

Figure 7:
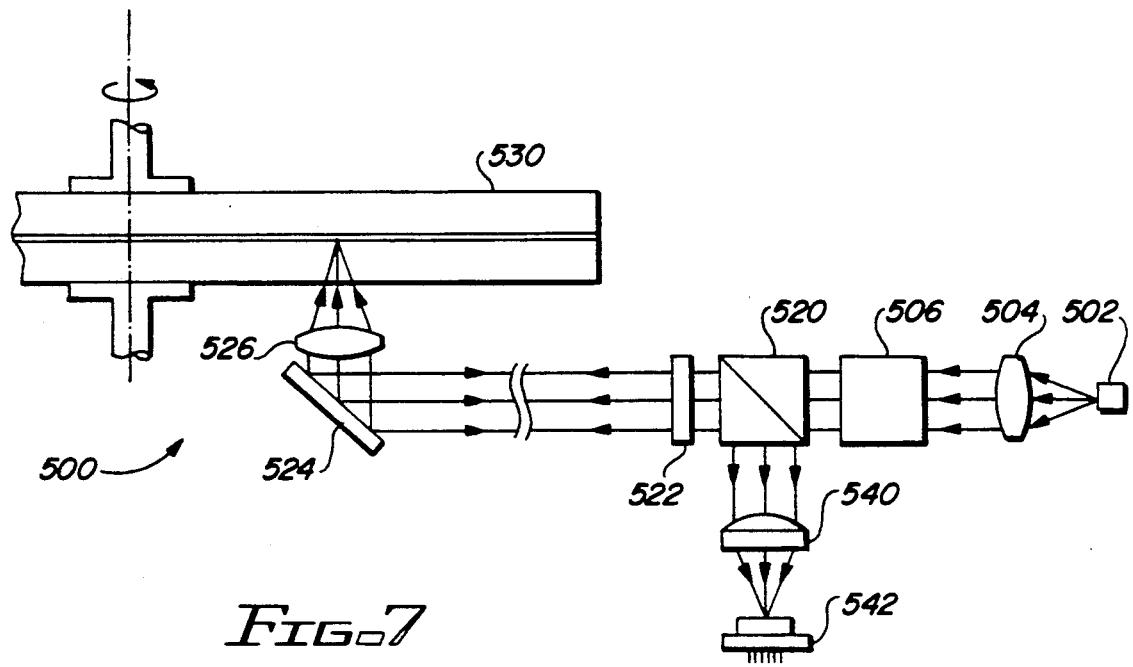
FIG. 7 is a schematic diagram of a phase change optical storage system.

FIG. 7 shows a phase change optical data storage system 500 which uses a laser system 502. Laser system 10 may be used for system 502. The light from system 502 is collimated by a lens 504 and passes to a circularizing optical element 506. Element 506 emits light having a circular cross-sectional beam pattern. Element 506 may be a prism.

The light then passes through a polarizing beamsplitter 520 and a quarter waveplate 522. The light is reflected off of a mirror 524 and focussed by lens 526 onto an optical recording medium 530. Medium 530 may be a phase change type of optical recording medium.

The light reflected from medium 530 returns through lens 526, is reflected off of mirror 524, passes through plate 522 to beamsplitter 520. Reflected light is then diverted by a beamsplitter 520 to an astigmatic lens 540. Lens 540 focuses the reflected light onto an optical detector 542. The recorded spots of the medium 530 have different reflectivities and these differences are detected by optical detector 542 as data ones and zero. Detector 542 also provides focus and tracking signals.

Figure 8:
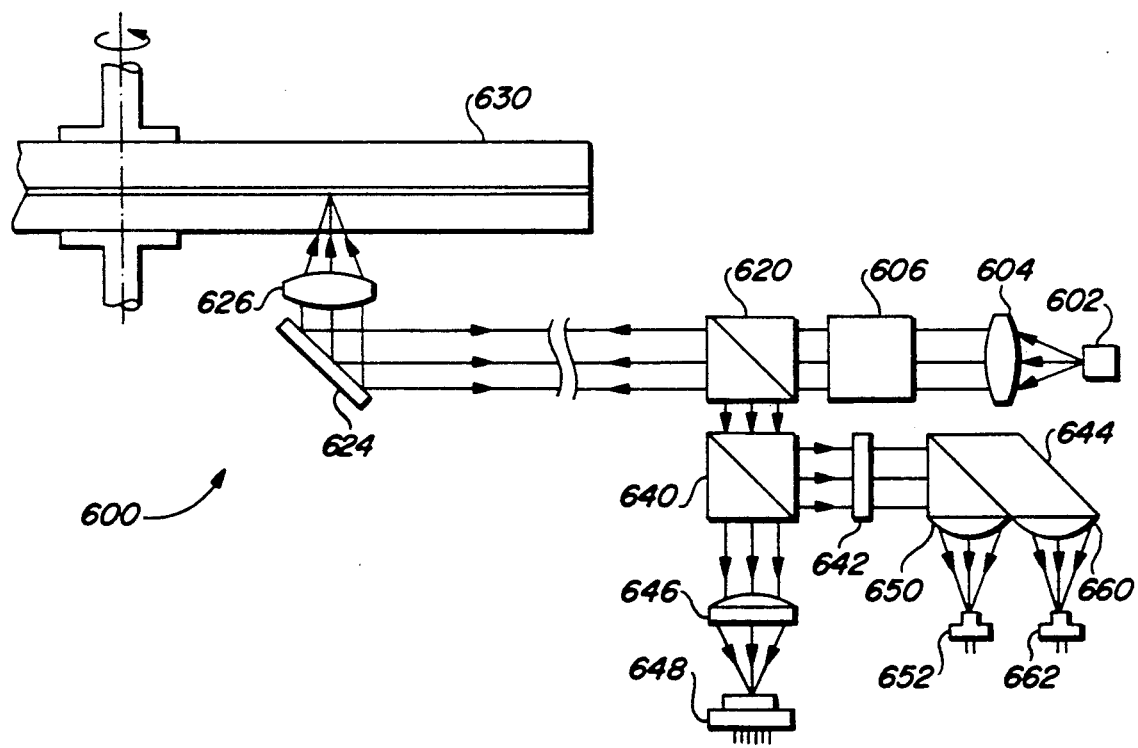
FIG. 8 is a schematic diagram of a magneto-optical storage system.

FIG. 8 shows a magneto-optic data storage system 600 which uses a laser system 602. Laser system 10 may be used for system 602. The light from system 602 is collimated by a lens 604 and passes to circularizing optical element 606. Element 606 emits light having a circular cross-sectional beam pattern. Element 606 may be a prism.

The light then passes through a leaky polarizing beamsplitter 620. Beamsplitter 620 has reflectivities of $RP>0$ and RS approximately equal to one (S and P represent the orthogonal polarization components of light). The light is then reflected off of a mirror 624 to a lens 626 and is focussed onto an optical recording medium 630. Medium 630 may be a magneto-optic type of optical recording medium. The light reflected from medium 630 returns through lens 626, reflects off of mirror 624, and enters beamsplitter 620. Beamsplitter 620 diverts the reflected light to an amplitude beamsplitter 640. Reflected data light is diverted to a half waveplate 642 and to a beamsplitter 644. Reflected light of other amplitudes passes straight through beamsplitter 640. This light is focussed by an astigmatic lens 646 to a quad detector 648 to produce tracking and focus signals.

The medium 630 has recorded spots having either an up or down magnetic domain. The light reflected off of these spots has its plane of polarization rotated one way or the other depending upon the direction of the magnetic domain of the spot. Beamsplitter 644 separates the reflected light depending upon which way the plane of polarization has been rotated. The separated beams go to a lens 650 and an optical detector 652 or to a lens 660 and an optical detector 662. The difference in output signals of detectors 652 and 662 are the data ones and zeros. A more detailed explanation of optical disk drives systems is given in "Gradient-Index Optics and Miniature Optics," SPIE, Vol. 935, p. 63, (1988) by Glenn T. Sincerbox.

The advantages of the present invention may now be understood. It has been discovered that a slight offset of the noncritical phase matching axis of a crystal relative to a beam path will cause the angle of the output beam to vary responsive to the change in crystal temperature. By determining this beam angle, an accurate temperature error signal may be generated. The result is that extremely accurate temperature control of the crystal is achieved. An additional benefit is that the direction and placement of the output beam can be locked in place. An efficient output of SHG light is produced which is especially suited to optical storage systems.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A nonlinear crystal system comprising:
   a radiation source for providing a primary beam;
   a nonlinear crystal for receiving the primary beam along a beam path axis, a noncritical phase matching axis of the nonlinear crystal oriented nonparallel to the beam path axis;
   a beam angle detection means for receiving an output beam from the nonlinear crystal, detecting an output beam angle and generating a temperature error signal; and
   a crystal temperature adjustment means connected to the beam angle detection means and the crystal for adjusting the temperature of the crystal responsive to the temperature error signal.

2. A nonlinear crystal system comprising:
   a radiation source for providing a primary beam;
   a nonlinear crystal for receiving the primary beam along a beam path axis, a noncritical phase matching axis of the nonlinear crystal oriented nonparallel to the beam path axis;
   a segmented optical detector for receiving an output beam from the nonlinear crystal;
   a temperature control circuit connected to the optical detector for generating a temperature error signal;
   a crystal temperature adjustment means connected to the temperature control circuit and the crystal for adjusting the temperature of the crystal responsive to the temperature error signal.

3. The system of claim 2 wherein,
   the radiation source is a GaAlAs laser diode.

4. The system of claim 2 wherein,
   the crystal is a $KNbO_3$ crystal.

5. The system of claim 2 wherein,
   the crystal temperature adjustment means is a thermo-electric element.

6. The system of claim 2 wherein,
   the crystal temperature adjustment means is a resistive heater.

7. The system of claim 2 further including:
   a resonator cavity positioned around the nonlinear crystal.

8. A nonlinear crystal system comprising:
   a laser for providing a first frequency light beam;
   a resonator for receiving the first frequency light beam and resonating the first frequency light beam along a beam path;
   a nonlinear crystal located within the resonator for converting the first frequency light beam to a second frequency light beam, a nonlinear crystal oriented with its noncritical phase matching axis nonparallel to the beam path;
   a beamsplitter for receiving the second frequency light beam from a nonlinear crystal;
   a photodetector having a first and a second segment for receiving a portion of the second frequency light beam from the beamsplitter;
   a temperature control circuit connected to the photodetector for detecting the difference in the amount of light striking the first and second segments and generating a temperature error signal responsive thereto; and
   a crystal temperature adjuster connected to the crystal and the temperature control circuit for adjusting the temperature of the crystal responsive to the temperature error signal.

9. The system of claim 8 wherein,
   a laser is a GaAlAs laser diode.

10. The system of claim 8 wherein,
    the crystal is a $KNbO_3$ crystal.

11. The system of claim 8 wherein,
    the crystal temperature adjuster is a thermo-electric element.

12. The system of claim 8 wherein,
    the crystal temperature adjuster is a resistive heater.

13. A method for crystal temperature control comprising the steps of:
    generating a radiation beam;
    passing the radiation beam through a nonlinear crystal along a beam path which is slightly offset from a noncritical phase matching axis of the crystal;
    detecting an angle at which the radiation beam exits the crystal; and
    adjusting the temperature of the crystal responsive to the measured angle.

14. A nonlinear crystal system comprising:
    a radiation generation source for providing a primary beam;
    a nonlinear crystal for receiving the primary beam along a beampath axis, a noncritical phase matching axis of the nonlinear crystal oriented nonparallel to the beampath axis;
    a beam angle detection means for receiving a first portion of an output beam from the nonlinear crystal, detecting an output beam angle and generating a temperature error signal;
    a crystal temperature adjustment means connected to the beam angle detection means and the crystal for adjusting the temperature of the crystal responsive to the temperature error signal;
    an optical recording medium;
    an optical transmission means for receiving a second portion of said output beam from the nonlinear crystal and directing said second portion to the optical recording medium; and
    optical reception means for receiving a reflected light beam from the optical recording medium and providing a data signal responsive thereto.

* * * * *